United States Patent [19]
Regener et al.

[11] Patent Number: 5,726,796
[45] Date of Patent: Mar. 10, 1998

[54] OPTICAL AMPLIFIER

[75] Inventors: Rolf Regener, Oberriexingen; Gottfried Schmitt, Nürnberg, both of Germany

[73] Assignee: Alcatel N.V., Rijswijk, Netherlands

[21] Appl. No.: 645,775

[22] Filed: May 14, 1996

[30] Foreign Application Priority Data

May 17, 1995 [DE] Germany ............... 195 18 021.6

[51] Int. Cl.[6] .................................. G02B 6/30; H01S 3/19
[52] U.S. Cl. .................................... 359/341; 259/163
[58] Field of Search ............................. 359/143, 160, 359/163, 176, 341

[56] References Cited

U.S. PATENT DOCUMENTS

| | | | |
|---|---|---|---|
| 5,128,801 | 7/1992 | Jensen et al. | 359/347 |
| 5,194,917 | 3/1993 | Regener | 356/350 |
| 5,383,051 | 1/1995 | Delrosso et al. | 359/341 |
| 5,393,371 | 2/1995 | Chang et al. | 156/629 |
| 5,414,549 | 5/1995 | Nishimura et al. | 359/160 |

FOREIGN PATENT DOCUMENTS

| | | |
|---|---|---|
| 0527604 | 2/1993 | European Pat. Off. |
| 0595396 | 5/1994 | European Pat. Off. |
| 0640853 | 3/1995 | European Pat. Off. |
| 0171615 | 2/1996 | European Pat. Off. |
| 4027024 | 8/1990 | Germany |
| 4027024 | 3/1992 | Germany |
| 62-23432 | 10/1987 | Japan |
| 3071115 | 3/1991 | Japan |
| 62-35832 | 8/1994 | Japan |

OTHER PUBLICATIONS

"Bidirectional Fiber Amplifiers", C. Barnard et al., *IEEE Photonics Technology Letters*, vol. 4, No. 8, Aug. 1992, pp. 911–913.

Patent Abstracts of Japan JP 3071115 dated 03/26/91 vol. 15, No. 234 & Japanese Patent Application JP 890206937, filed Aug. 11, 1989 to Nippon Telegr & Teleph. Corp.

"Bidirectional Fiber Amplifiers", C. Barnard et al., *IEEE Photonics Technology Letters*, vol. 4, No. 8, Aug. 1992, pp. 911–913.

"Planar Waveguide Lasers and Amplifiers", *Light*, vol. 2, No. 2, Oct. 1994, Optoelectronic Research Center, University of Southhampton.

*Primary Examiner*—Nelson Moskowitz
*Attorney, Agent, or Firm*—Ware, Fressola, Van Der Sluys & Adolphson

[57] ABSTRACT

In the optical amplifier designed as a bidirectionally operating IOC module for use in optical broadband systems, two spatially separated, erbium-doped active waveguides (16, 30) are integrated on a silicon substrate (1), and have different amplification factors. A hybrid integrated pump-light source (2) feeds a coupler (3) with an asymmetrical power distribution, e.g. 10% to 90%. The portion of pump light with the greater power is supplied via a coupler (6), together with the signal light coming from a first amplifier connection (9, 10), to a first active waveguide (16), and the portion of the pump light with the lower power is supplied via another coupler (24), together with the signal light coming from a second amplifier connection (9, 22), to a second active waveguide (30), and to the first amplifier connection through a coupler (12).

18 Claims, 1 Drawing Sheet

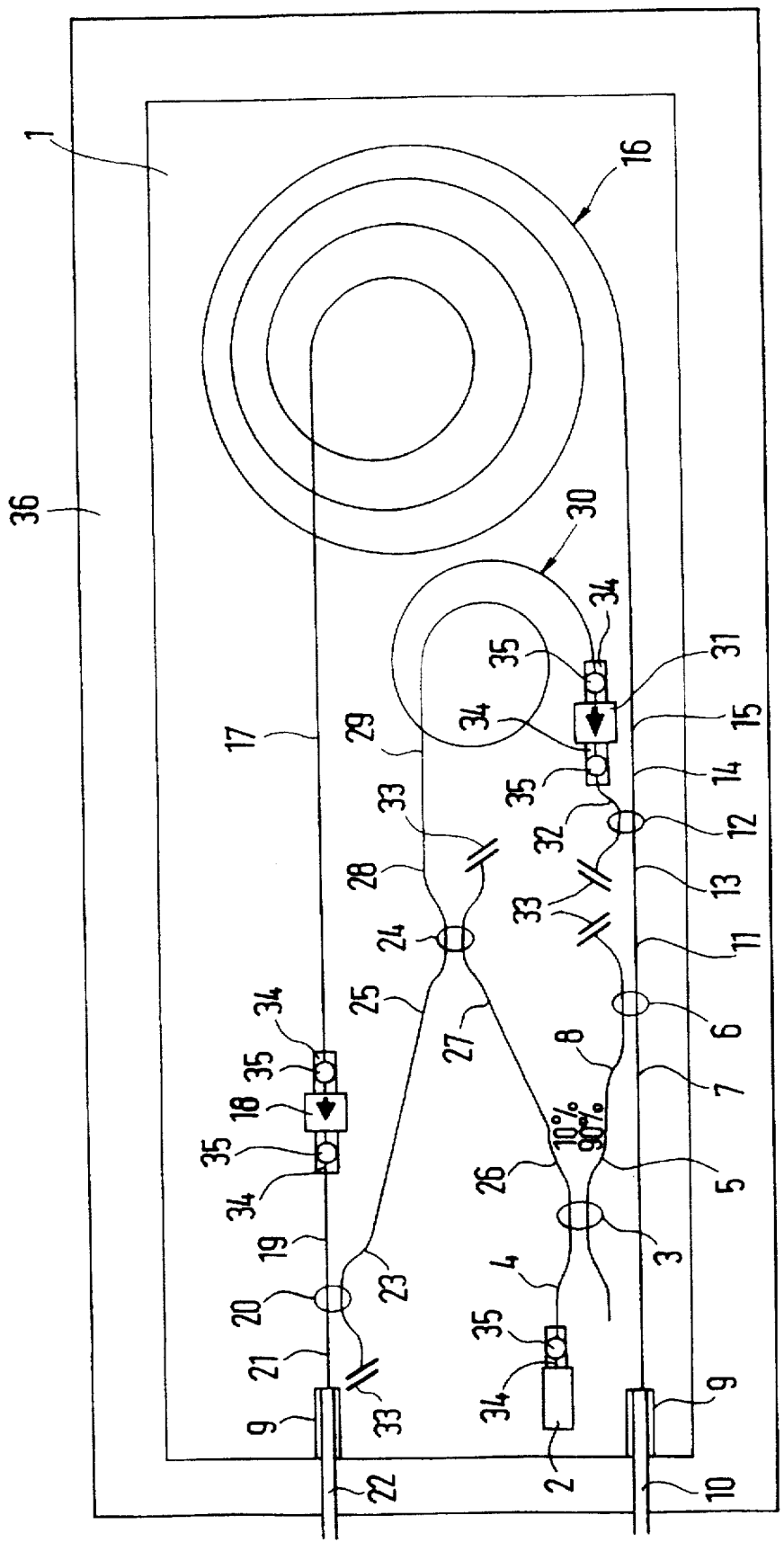

OPTICAL AMPLIFIER

TECHNICAL FIELD

The invention concerns an optical amplifier for particular use in the systems of optical communications technology.

BACKGROUND OF THE INVENTION

An optical amplifier is known from publication IEEE PHOTONICS TECHNOLOGY LETTERS, Vol. 4, No. 8, August 1992, pages 911 to 913. It basically comprises a pump-light source, several fiber-optic couplers, two erbium-doped active fiber coils and two optical isolators. The connections between the ends of the fiber-optic units, and between the incoming and outgoing transmission line, are conventional fiber splices.

An optically integrated hybrid switching circuit is known from EP 0 171 615 B1, wherein optical waveguides made of glass with a high quartz content, are coupled on a silicon substrate to a laser, a diode and glass fibers, for example either directly, or by means of spherical lenses.

In addition, the publication "Light, Vol. 2, No. 2, October 1994" (Optoelectronic Research Center, University of Southhampton) proposes an integrated circuit in which waveguides designed as a pump-coupler and a cascaded Y-junction are located on part of the surface of a glass substrate, and where the path of an erbium-doped waveguide is spirally arranged on the other part.

Furthermore, DE 40 27 024 (see U.S. Pat. No. 5,194,917) describes configuration examples of fiber gyros, wherein both passive and active optical and electronic functional units are integrated in a silicon substrate, namely both in the form of hybrid switching circuits and in monolithic configurations.

DISCLOSURE OF INVENTION

The invention has the task of creating an optical amplifier for use in broadband systems, which can be cost-effectively produced.

According to the present invention, a bidirectional optical amplifier for broadband systems comprising two spatially separate, rare-earth-doped active waveguides and a pump-light source which feeds a first coupler from which a first portion of the pump light proceeds to a second coupler, together with signal light arriving from a first amplifier connection through a first active waveguide to a second amplifier connection and a second portion of pump light proceeds to a further coupler together with signal light arriving at the second amplifier connection and proceeds from a second active waveguide to the first amplifier connection, is characterized in that the optical waveguides are integrated on a substrate and that the active optical waveguides each have a spiral configuration with an output that crosses at least one winding from inside the spiral configuration.

These and other objects, features and advantages of the present invention will become more apparent in light of the detailed description of a best mode embodiment thereof, as illustrated in the accompanying drawing.

BRIEF DESCRIPTION OF THE DRAWING

The invention is described in more detail by means of the sole FIGURE, which schematically represents an optical amplifier, according to the invention.

BEST MODE FOR CARRYING OUT THE INVENTION

A substrate 1 in the drawing is preferably made of silicon and has optical waveguides that are integrated in different configurations. In addition, the substrate 1 has a hybrid integrated pump-light source 2 arranged in front of an input branch 4 of a first coupler 3, so that pump light is coupled into the input branch 4. A first output branch 5 is connected from the first coupler 3 to a second input branch 8 of a second coupler 6, whose first input branch 7 ends in a V-groove 9. The input branch 7 forms a first amplifier connection. The V-groove 9, which is located on the narrow side of the rectangular substrate 1, is used to receive and couple a first glass fiber 10.

An output branch 11 of the second coupler 6 is connected to a first branch 13 of a third coupler 12, whose opposite branch end 14 is connected to the input 15 of a first waveguide 16, which is doped with a rare earth element, such as erbium e.g., and is called the first active waveguide in the following. This active waveguide 16 has a spiral configuration with an output 17 that crosses several windings from the inside, which in the passage direction ends before a hybrid integrated first optical isolator 18.

A first branch 21 of a fourth coupler 20 starts at the output side of this isolator 18, whose opposite branch end 21 ends in another V-groove 9, which is located parallel to, and at a distance from the previously mentioned one, and is used to couple a second glass fiber 22 to the branch end 21 of the fourth coupler 20. This branch end 21 forms a second amplifier connection.

A signal light arriving at the first input branch 7 of the second coupler 6 via the first glass fiber 10, is fed pump light from the pump-light source 2 via the input branch 4, and the first output branch 5 of the first coupler 3, and via the second input branch 8 of the second coupler 6, where the light propagates together with the signal light through the output branch 11 of the second coupler 6 and the first branch 13 of the third coupler 12, as well as through its opposite branch end 14 and through the input 15, into the active waveguide 16. The thus amplified signal light proceeds through output 17 of the active waveguide 16 through the first optical isolator 18, and is coupled into the second glass fiber 22 through the first branch 19 of the fourth coupler 20, and its opposite branch end 21.

An optical broadband system, such as the project "Video On Demand with Multimedia Distribution", where a very large amount of data is offered to each subscriber, requires a return channel, through which the subscriber can signal his targeted selection. For this reason, the optical amplifier is designed to operate bidirectionally. This means that signal light arriving from the subscriber at the second amplifier connection via the second glass fiber 22, is blocked by the first optical isolator 18 and is coupled over into the second branch 23 of the fourth coupler 20, which is connected to the first input branch 25 of a fifth coupler 24.

The last-mentioned fifth coupler 24 receives pump light from the pump-light source 2 via a second output branch 26 of the first coupler 3, and a second input branch 27 of the fifth coupler 24, which is connected to the output branch 26, where the light propagates together with the signal light from the subscriber through the output branch 28 of the fifth coupler 24, and through an input 29 into a second waveguide 30, which is also doped with a rare earth element, such as erbium e.g., and is called the second active waveguide 30 in the following. The thus amplified signal light proceeds through a second hybrid integrated isolator 31, passes through a second branch 32 of the third coupler 12, is coupled over into its first branch 13, and is coupled into the glass fiber 10 through the output branch 11 of the second coupler 6 and its first input branch 7.

Since the signal light coming from the subscriber via the second glass fiber 22 contains a much smaller amount of data than the signal light coupled into the first glass fiber 10, the first coupler 3, which branches the pump light, has an asymmetric power distribution, wherein for example 90% of the pump light is fed to the signal light coupled into the first glass fiber 10, and 10% of the pump light is fed to the signal light coming through the second glass fiber 22. Accordingly, the second erbium-doped waveguide 30 only has a simple loop-shaped configuration with a relatively short line, where the line path of input 29 is only crossed once and then extends in a semicircular arc to before the second optical isolator 31. If necessary, the first coupler can also have any other desired asymmetric power distribution. The amplification factors of the first and the second active waveguide 16, 30 correspond approximately to the asymmetric power distribution of the first coupler 3, which is fed pump light.

In the optical amplifier, couplers 3, 6, 12, 20, 24 are integrated on a substrate 1 and have an X-shaped configuration wherein, except for the first coupler 3, an unused branch always ends in an optical sump 33 to prevent reflections. In addition, a spherical lens 35, which is fixed in a V-groove 34, is used for the optimum coupling of pump-light source 2 and optical isolators 18, 31 on the one hand, and the various waveguides on the other. The hybrid integrated optical isolators 18, 31 and the pump-light source 2 are preferably fixed with narrow tolerance in mounting pits which, like the V-grooves 34, are dug out by means of known etching techniques.

The different optical units only occupy a relatively small area of the substrate 1. The optimum distribution is achieved in that the pump-light source 2, the first coupler 3 which is fed by the pump-light source 2, and the fifth coupler 24 which is connected to the first coupler 3, as well as the second active waveguide 30 connected thereto, and the second optical isolator 31 which is connected to the output of waveguide 30, are arranged in the area between the line path leading from the first amplifier connection to the spiral of the first active waveguide 16, and the line path leading from the spiral to the second amplifier connection.

The application of the optical waveguide on the substrate 1 made of Si is made by using the FHD (Flame Hydrolysis Deposition) method, whereby doped $SiO_2$ particles are precipitated in tracks on a rotating Si wafer. Since the erbium-doped area for the active waveguides 16, 30 is relative large, it is selectively produced in a manner that differs from the one mentioned before, whereby the gas composition is changed when the erbium-doped $SiO_2$ particles are applied, or two burners are used for the operation. In the transition area between the active waveguides 16, 30 and the other waveguides, subsequent sintering produces a diffusion area with a low attenuation that is optically advantageous.

If necessary, the finished substrate 1 with the different optical units can also be equipped with an integrated electric driver circuit for the laser, which is used as the pump-light source 2 (not illustrated). The substrate 1 is placed in a housing 36 which serves as a mechanical protection.

The present configuration of the optical amplifier is noteworthy due to its extremely small dimensions, and has a significantly higher functional reliability because of the high degree of integration, as opposed to fiber-optic solutions. Since the optically integrated amplifier can also be efficiently produced during usage, it can be economically and cost-effectively manufactured at relatively low production costs.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A bidirectional optical amplifier for broadband systems, comprising two spatially separate, rare-earth-doped active waveguides (16, 30) and a pump-light source (2) which feeds a first coupler (3), from which a first portion of the pump light proceeds to a second coupler (6), together with signal light arriving from a first amplifier connection (9, 10), through a first active waveguide (16) to a second amplifier connection (9, 22), and a second portion of pump light proceeds to a further coupler (24), together with signal light arriving at the second amplifier connection (22), and proceeds from a second active waveguide (30) to the first amplifier connection (9, 10), characterized in that the active optical waveguides (16, 30) are integrated on a substrate (1), that the active optical waveguides (16, 30) have a spiral configuration, each with an output that crosses at least one winding from inside the spiral configuration, and that the first coupler (3), which is fed by the pump-light source (2), has an asymmetric power distribution.

2. An optical amplifier as claimed in claim 1, characterized in that the first coupler (3), which is fed by the pump-light source (2), has an asymmetric power distribution.

3. An optical amplifier as claimed in claim 1, characterized in that branches of the first coupler (3) have a power distribution that is 10% to 90%.

4. An optical amplifier as claimed in claim 1, characterized in that the active waveguides (16, 30) have different amplification factors.

5. An optical amplifier as claimed in claim 1, characterized in that the pump-light source (2) is a hybrid integrated laser.

6. An optical amplifier as claimed in claim 1, characterized in that the substrate (1) incorporates hybrid integrated optical isolators (18, 31).

7. An optical amplifier as claimed in claim 5, characterized in that the pump-light source (2) and the optical isolators (18, 31) are each coupled to the optical waveguides by means of a spherical lens (35), which is fixed in a V-groove (34).

8. An optical amplifier as claimed in claim 1, characterized in that the first amplifier connection (9, 10) and the second amplifier connection (9, 22) are located on a same side of the substrate (1).

9. An optical amplifier as claimed in claim 8, characterized in that the substrate (1) is made of silicon.

10. An optical amplifier as claimed in claim 1, characterized in that the pump-light source (2), the first coupler (3) fed by the pump-light source (2), and the further coupler (24) connected to the first coupler (3), as well as a second active waveguide (30) connected thereto, and an optical isolator (31) which is connected to the output of the second active waveguide (30), are arranged in an area of the substrate between a line path leading from the first amplifier connection to the spiral configuration of the first active waveguide (16), and a line path leading from the output of the spiral configuration of the first active waveguide (16) to the second amplifier connection.

11. An optical amplifier as claimed in claim 6, characterized in that the pump-light source (2) and the optical isolators (18, 31) are each coupled to the optical waveguides by means of a spherical lens (35), which is fixed in a V-groove (34).

12. A bidirectional optical amplifier for broadband systems, comprising:

a substrate (1);

a first amplifier connection (9, 10) for receiving a first optical signal;

a second amplifier connection (9, 22) for receiving a second optical signal;

a first spatially separate, rare-earth-doped active waveguide (16) being coupled between the first amplifier connection (9, 10) and the second amplifier connection (9, 22), being integrated on the substrate (1), and having a first waveguide spiral configuration with a first waveguide output that crosses at least one winding from inside the first waveguide spiral configuration;

a second spatially separate, rare-earth-doped active waveguide (30) also being coupled between the first amplifier connection (9, 10) and the second amplifier connection (9, 22), also being integrated on the substrate (1), and having a simple loop-shaped configuration with a second waveguide output that crosses only one winding from inside the simple loop-shaped spiral configuration;

a pump-light source (2) for providing pump light to the first spatially separate, rare-earth-doped active waveguides (16) and the second spatially separate, rare-earth-doped active waveguides (30); and a coupler (3) having an asymmetric power distribution, for providing a first percentage of pump light to couple with the first optical signal that proceeds to the first spatially separate, rare-earth-doped active waveguide (16), and for providing a second percentage of pump light to couple with the second optical signal that proceeds to the second spatially separate, rare-earth-doped active waveguide (30), the first percentage of pump light being substantially greater than the second percentage of pump light.

13. An optical amplifier according to claim 12, wherein the first percentage of pump light is 90% and the second percentage of pump light is 10%.

14. An optical amplifier according to claim 12, wherein the first and second spatially separate, rare-earth-doped active waveguides (16, 30) have different amplification factors.

15. An optical amplifier according to claim 14, wherein the pump-light source (2) is a hybrid integrated laser.

16. An optical amplifier according to claim 15, wherein the substrate (1) incorporates a first hybrid integrated optical isolator (18) connected to the first spatially separate, rare-earth-doped active waveguide (16); and the substrate (1) incorporates a second hybrid integrated optical isolator (31) connected to the second spatially separate, rare-earth-doped active waveguide (30).

17. An optical amplifier according to claim 16, wherein the pump-light source (2), the first coupler (3) fed by the pump-light source (2), and a coupler (24) connected to the first coupler (3), as well as the second spatially separate, rare-earth-doped active waveguide (30) connected thereto, and an optical isolator (31) which is connected to the second waveguide output of the second spatially separate, rare-earth-doped active waveguide (30), are arranged in an area of the substrate between a line path leading from the first amplifier connection (9, 10) to the spiral configuration of the first spatially separate, rare-earth-doped active waveguide (16), and a line path leading from the first waveguide output of the first spatially separate, rare-earth-doped active waveguide (16) to the second amplifier connection (9, 22).

18. A bidirectional optical amplifier for broadband systems, comprising two spatially separate, rare-earth-doped active waveguides (16, 30) and a pump-light source (2) which feeds a first coupler (3), from which a first portion of the pump light proceeds to a second coupler (6), together with signal light arriving from a first amplifier connection (9, 10), through a first active waveguide (16) to a second amplifier connection (9, 22), and a second portion of pump light proceeds to a further coupler (24), together with signal light arriving at the second amplifier connection (22), and proceeds from a second active waveguide (30) to the first amplifier connection (9, 10), wherein each of the two spatially separate, rare-earth-doped active waveguides (16, 30) is integrated on a substrate (1); and wherein each of the two spatially separate, rare-earth-doped active waveguides (16, 30) has a respective spiral configuration with a respective output waveguide (17, 29) that crosses at least one winding from inside the respective spiral configuration.

* * * * *